United States Patent

Lopez et al.

[11] Patent Number: 6,152,384
[45] Date of Patent: Nov. 28, 2000

[54] SPRAYING DEVICE FOR JETS OF WINDSCREEN WASHERS IN MOTOR VEHICLES

[75] Inventors: Miguel Mota Lopez; Juan Jesús Elvira Peralta, both of Rubi, Spain

[73] Assignee: Fico Transpar, S.A., Barcelona, Spain

[21] Appl. No.: 09/202,762

[22] PCT Filed: May 19, 1997

[86] PCT No.: PCT/ES97/00124

§ 371 Date: Dec. 21, 1998

§ 102(e) Date: Dec. 21, 1998

[87] PCT Pub. No.: WO97/48495

PCT Pub. Date: Dec. 24, 1997

[30] Foreign Application Priority Data

Jun. 18, 1996 [ES] Spain ................................. 9601351

[51] Int. Cl.[7] ............................................. B05B 1/10
[52] U.S. Cl. ................................. 239/284.1; 239/492
[58] Field of Search ........................... 239/492, 289.1, 239/284.2, 469

[56] References Cited

U.S. PATENT DOCUMENTS 3,625,437  12/1971  Garrigou .
4,076,174   2/1978  Volgel et al. ........................... 239/492
4,322,037   3/1982  Heeb et al. ............................ 239/492
5,711,488   1/1998  Lund ..................................... 239/492
5,738,282   4/1998  Grogan ................................. 239/492

FOREIGN PATENT DOCUMENTS 1355350   2/1964  France .
2043488  10/1980  United Kingdom ................... 239/492

Primary Examiner—Kevin Weldon
Attorney, Agent, or Firm—Michael J. Striker

[57] ABSTRACT

A spraying device for windscreen washer nozzles of automobile vehicles has a fixing body and a spraying body which are coupled coaxially to each other and to a nozzle body attachable to a body work and connectable to a cleaning liquid tube. The coupling of the fixing and spraying body forms a cleaning liquid inlet chamber, a plurality of independent intermediate chambers which lead into the inlet chamber, and an outlet chamber which links with intermediate chambers by ducts, while an outlet of the cleaning liquid in spray form is implemented through an orifice in the spraying body superimposed on the outlet chamber.

4 Claims, 1 Drawing Sheet

SPRAYING DEVICE FOR JETS OF WINDSCREEN WASHERS IN MOTOR VEHICLES

TECHNICAL FIELD OF THE INVENTION

The object of the invention is a spraying device for windscreen washer nozzles of automobile vehicles.

BACKGROUND OF THE INVENTION

Known in the art are an extensive variety of embodiments of nozzles for windscreen washer installations of automobile vehicles which, in general, include a nozzle body fixed to the bodywork of the vehicle, frequently to the bonnet, and means to project the cleaning liquid which essentially consist in a ball mounted with a snug fit in a cavity of the nozzle body, which ball has a through-orifice with a conical cleaning-liquid intake mouth and can be rotated in any direction between the directions normally used for suitable projection of said liquid against the windscreen. The usual practice for the cleaning of windscreens is to fit two nozzles which act simultaneously.

In known embodiments of nozzles such as those described above, the projection of cleaning liquid consists in a jet of relatively high flow and pressure which reaches the windscreen at a point determined by the position of the ball, which mode of projection has the disadvantages detailed below. The volume of cleaning liquid used in each cleaning operation is relatively high, which leads to a situation in which, in order to make provision for a certain number of windscreen cleaning operations between consecutive refillings of the cleaning liquid reservoir fitted ex-works to the automobile vehicles, said reservoirs have to be of considerable volume, which is a significant obstacle to situating them in the engine compartment. This difficulty of situation is accentuated where, for reasons or volume or any other reasons, the cleaning liquid reservoir cannot be situated in said engine compartment, but has instead to be situated in zones of the vehicle bodywork which at least raise problems of installation, of access to electrical pumps for propelling the cleaning liquid, of passage of tubes, etc., which in any case increase both fitting and maintenance costs.

Means for projecting liquid by spraying are known. The patent document FR-A-1355350 discloses a spray head for pressurized containers in which there is an outlet chamber feeded through conducts tangentially disposed; the admission of the pressurized liquid produces a swirl in said chamber. Patent document U.S. Pat. No. 3,625,437 describes a spray head in which there is a perimetral inlet chamber communicating with an outlet chamber through tangential conducts. The devices described in both documents, FR-A-1355350 and U.S. Pat. No. 3,625,437, produce a swirl of the fluid which is not applicable to the projection of cleaning liquid on a vehicle windscreen.

EXPLANATION OF THE INVENTION

A spraying device of new structure and mode of operation for windscreen washer nozzles of automobiles is made known herein in order to provide a solution for the disadvantages deriving from the high consumption of cleaning liquid of the known embodiments of nozzles equipped with ball-type liquid-propulsion means.

The spraying device of the invention has a nozzle body of a shape suited to each specific case of application, preferably made of plastic material, which nozzle body has means for exterior attachment thereof to the bodywork of the vehicle and means to receive a cleaning liquid tube.

The nozzle device of the invention is characterized in that it includes a spraying body and a fixing body which can be coupled coaxially to each other and to the nozzle body, in which:

the spraying body is of a generally hollow cylindrical shape open at one of its ends and having on its internal side face and running from the edge of the open end a plurality of regularly distributed longitudinal ribs which extend up to the interior face or bottom of the closed end, and in that bottom end and running from the centre of same a plurality of grooves which extend up to the internal side face between corresponding and adjacent longitudinal ribs, and at the closed end a through-orifice in centred position;

the fixing body is of generally cylindrical shape, having at one of its ends, the exterior end, a coaxial groove of U-shaped cross-section designed to receive with a snug fit the open end of the spraying body and forming an axial cylindrical portion, while at its other end, the interior end, it has a centred orifice of quadrangular cross-section which leads into the coaxial groove to form two passage openings; and for coupling of the fixing and nozzle bodies, the nozzle body has a fixing orifice designed to receive the fixing body with a snug fit, the bottom of the fixing orifice into which the centred orifice of the fixing body leads having a hydraulic duct with means for receiving the aforesaid cleaning liquid tube, all of this so designed that coupling of the spraying, fixing and nozzle bodies forms:

a cleaning liquid inlet chamber formed between the bottom of the coaxial groove of the fixing body and the open end of the spraying body, into which the passage openings of the fixing body lead;

a plurality of independent intermediate chambers formed by the longitudinal ribs of the spraying body and the axial cylindrical portion of the fixing body, which lead respectively into the inlet chamber; and a plurality of ducts formed by the grooves at the bottom of the spraying body and the free end of the cylindrical portion of the fixing body, which ducts link corresponding intermediate chambers with an outlet chamber formed by the intersection of said ducts, into which outlet chamber the centred through-orifice of the closed end of the spraying body leads.

According to another characteristic of the spraying device of the invention, there are four intermediate chambers.

According to another characteristic of the spraying device of the invention, between the bottom of the fixing orifice of the nozzle body and the interior end of the fixing body a filtering element is fitted.

The above-described characteristics of the spraying device of the invention provide an innovative solution to the problems raised by the large dimensions of the cleaning liquid reservoirs normally used in windscreen washer installations, and the problems involved in situating same on the vehicle, those dimensions being largely determined, as outlined above, by the high flow of cleaning liquid projected by the known embodiments of nozzles fitted with ball-type projection means. Indeed, from the tests carried out by the inventor, and with equal results in respect of windscreen cleaning and number of cleaning operations under similar conditions, use of the spraying device of the invention reduces consumption of cleaning liquid by up to 85% with respect to the consumption arising with the known embodiments of nozzles equipped with ball-type liquid-projection means. Under equal conditions in terms of number of cleaning operations which can be allowed for between consecutive refillings of the cleaning liquid reservoir, this reduction of cleaning liquid permits windscreen-washer installations to be equipped with cleaning liquid reservoirs of very small dimensions. From results obtained in tests carried out by the inventor, the latter concludes that windscreen washer installations fitted with the spraying device of the invention can be equipped with cleaning liquid reservoirs having a volume between 1 $dm^3$ and 2 $dm^3$, which in most cases practically allows the cleaning liquid reservoir to be situated in the engine compartment, or easily situated in places of the vehicle bodywork which allow easy access for fitting and refilling operations.

In addition to the above, use of the spraying device of the invention provides the following advantages. The spraying of the cleaning liquid acts upon a cleaning liquid receiving surface which practically covers the surface area of the windscreen, so that the action of the windscreen wipers is enhanced right from the moment when projection of the cleaning liquid starts, unlike in the known embodiments of nozzles equipped with ball-type projection means, in which the impact area of the jet of cleaning liquid is very small and that liquid has to be distributed over the surface area of the windscreen by the action of the windscreen wipers. Furthermore, in places where parked vehicles are subject, due to low ambient temperatures, to accumulations of ice in the form of a layer on the windscreen, spraying of the cleaning liquid greatly facilitates removal of that ice layer.

BRIEF DESCRIPTION OF THE DRAWINGS

The drawing sheets of this specification show the spraying device of the invention for windscreen washer nozzles of automobile vehicles. In said drawings.

DETAILED DESCRIPTION OF THE EXAMPLE OF EMBODIMENT

Figure 9:
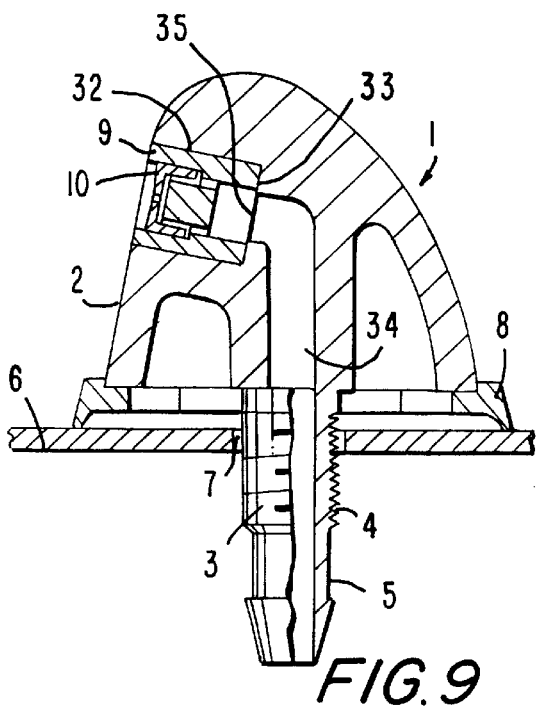
FIG. 9 is a section view of a nozzle fitted with the spraying device of the invention.

The spraying device of the invention for windscreen washer nozzles of automobile vehicles described as an example of embodiment is applied, as shown by FIG. 9, to a nozzle 1 which comprises a nozzle body 2 provided with an axial extension 3 having a screw thread 4 and an opening 5 designed for connecting a flexible cleaning liquid tube (not shown); the nozzle body 2 can be attached to the bodywork 6 of the vehicle, for example to the bonnet, by means of its axial extension 3, which passes through a through-orifice 7 made in the bodywork 6, and through a leaktight gasket 8, the nozzle body 2 being fixed to the bodywork 6 by means of a nut (not shown) threaded down on the screw thread 4 of the axial extension 3, in such a way that tightening down of said nut subjects the gasket 8 to compression between the nozzle body 2 and the bodywork 6.

Figure 1:
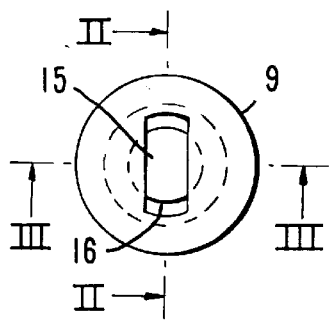
FIG. 1 is a plan view of the fixing body of the spraying device of the invention.
Figure 2:
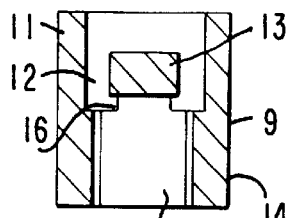
FIG. 2 is the view corresponding to the section II—II of FIG. 1.
Figure 3:
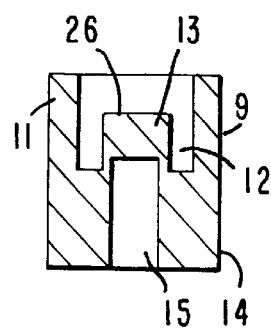
FIG. 3 is the view corresponding to section III—III of FIG. 1.
Figure 4:
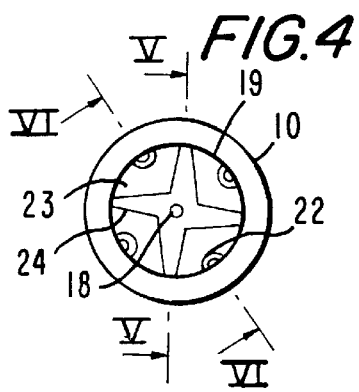
FIG. 4 is a plan view of the spraying body of the spraying device of the invention.
Figure 5:
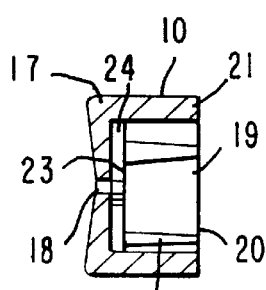
FIG. 5 is the view corresponding to section V—V of FIG. 4.
Figure 6:
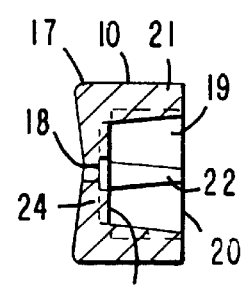
FIG. 6 is the view corresponding to section VI—VI of FIG. 4.

The spraying device of the invention includes a fixing body 9, shown in plan view and in section in FIGS. 1, 2 and 3, and a spraying body 10 shown in plan view and in section in FIGS. 4, 5 and 6.

FIGS. 1, 2 and 3 show how the fixing body 9 is of a generally long cylindrical shape: at one of its ends, the exterior end 11, it has a coaxial groove 12 with a cross-section which is generally U-shaped in outline and forms an axial cylindrical portion 13; at its other end, the interior end 14, it has a centred orifice 15 of quadrangular cross-section, and more specifically of rectangular cross-section with its two shorter sides presenting a certain concavity, all this so designed that the centred orifice 15 leads into the coaxial groove 12 to form on the axial cylindrical portion 13 two passage openings 16 which are diametrically opposite each other, as shown in FIGS. 1 and 2.

FIGS. 4, 5 and 6 show how the spraying body 10 is of generally long, hollow cylindrical shape: one of the ends of the spraying body 10, the exterior end 17, is closed and has a centred through-orifice 18; to its interior, the spraying body 10 has, on its side face 19 and running from the edge 20 of its other end, the interior open end 21, four equal ribs 22 running longitudinally and distributed regularly, which run as far as the bottom 23 of the exterior closed end 17; and to the interior, in said bottom 23, the spraying body 10 has four grooves 24 running radially from the centre of said bottom 23 and extending as far as the side face 19 in a zone intermediate between two adjacent ribs 22. Preferably, the ribs 22 have an essentially semi-truncated-cone shape with their smaller base oriented towards the exterior, while the radial grooves 24 have a generally U-shaped cross-section of a width which increases in the direction running from the side face 19 towards the centre occupied by the through-orifice 18.

Figure 7:
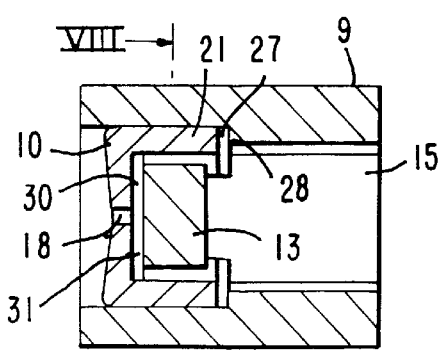
FIG. 7 is a longitudinal-section view of the coupling of the spraying and fixing bodies of the device of the invention.
Figure 8:
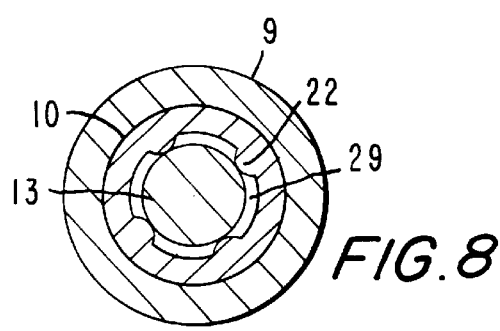
FIG. 8 is the view corresponding to section VIII—VIII of FIG. 7.

FIGS. 7 and 8 show how the coupling under pressure of the fixing 9 and spraying 10 bodies is implemented in such a way that the interior open end 21 of the spraying body 10 is arranged in the coaxial groove 12 of the fixing body 9, and the free end 26 of the axial cylindrical portion 13 of the fixing body 9 rests on the bottom 23 of the spraying body 10. This arrangement forms: an annular inlet chamber 27 which, as shown in FIG. 7, is formed between the bottom 28 of the groove 12 of the fixing body 9 and the interior open end 21 of the spraying body 10; four independent intermediate chambers 29 formed, as shown in FIG. 8, between the axial cylindrical portion 13 of the fixing body 9 and the longitudinal ribs 22 of the spraying body 10; and, as shown in FIG. 7, four radial ducts 30 formed by the grooves 24 of the bottom 23 of the spraying body 10 and the free end 26 of the cylindrical portion 13 of the fixing body 9, which ducts 30 link respective intermediate chambers 29 with an outlet chamber 31 formed by the intersection of said radial ducts 30.

FIG. 9 shows how the coupling of the fixing 9 and spraying 10 bodies to the nozzle body 2 is implemented under pressure by means of an orifice 32 made in the nozzle body 2, which orifice 32 establishes hydraulic communication at its bottom 33 with a longitudinal duct 34 of the axial extension 3 through a filtering element 35, preferably a metal mesh. With this arrangement of the nozzle 2, fixing 9 and spraying 10 bodies, the cleaning liquid driven by the electric pump (not shown) of the windscreen washer installation reaches the duct 34 of the nozzle body 2, passing successively through: the filtering element 35 which prevents the passage of solid bodies in suspension transported by the cleaning liquid; the centred orifice 15 of the fixing body 9; the passage openings 16 in the fixing body 9; the annular inlet chamber 27; and simultaneously, through the four independent intermediate chambers 29, the radial ducts 30, the outlet chamber 31 and, finally, the centred through-orifice 18 where the cleaning liquid reaches the exterior in spray form.

What is claimed is:

1. A spraying device for windscreen washer nozzles of automobile vehicles, comprising a nozzle body provided with means for exterior attachment to a bodywork of the vehicle and with means for receiving a cleaning liquid tube; a spraying body of a substantially hollow cylindrical shape and having an open end, an internal side face, a bottom at a closed end, a plurality of uniformly distributed longitudinal ribs extending from an edge of said open end to said bottom, a plurality of grooves provided in said bottom and running from a center of said bottom to said internal side face between said longitudinal ribs and a central through-orifice provided at said closed end; a fixing body of a substantially cylindrical shape coupled coaxially to said spraying body and said nozzle body and having at one exterior end a coaxial groove of a U-shaped cross-section which is formed to receive with a snug fit said open end of said spraying body and forms an axial cylindrical portion, and at the other interior end having a central orifice of a quadrangular cross-section which leads into said coaxial groove and forms two passage openings; means for coupling said fixing body with said nozzle body and including a fixing orifice which receives said fixing body with a snug fit and has a bottom into which said central orifice of said fixing body leads; a cleaning liquid inlet chamber formed between a bottom of said coaxial groove of said fixing body and said open end of said spraying body so that said passage openings of said fixing body lead into said inlet chamber; a plurality of independent intermediate chambers formed by said longitudinal ribs of said spraying body and said axial cylindrical portion of said fixing body and leading into said inlet chamber; and a plurality of ducts formed by grooves provided in said bottom of said spraying body and a free end of said axial cylindrical portion of said fixing body, said ducts linking said intermediate chambers with an outlet chamber formed by intersection of said ducts so that said central through-orifice of said closed end of said spraying body leads into said outlet chamber.

2. A spraying device as defined in claim 1, wherein said nozzle body is composed of a plastic material.

3. A spraying device as defined in claim 1, wherein said intermediate chambers include four such intermediate chambers.

4. A spraying device as defined in claim 1, and further comprising a filtering element located between said bottom of said fixing orifice of said nozzle body and said interior end of said fixing body at an inlet of said central orifice of rectangular cross-section of said fixing body.

* * * * *